July 15, 1969     H. FUNFSTUCK     3,456,173

PROGRAMMING SYSTEM

Filed June 22, 1966

INVENTOR.
HORST FUNFSTUCK

BY Kendrick, Subkow & Stolzy
ATTORNEY

United States Patent Office 3,456,173
Patented July 15, 1969

3,456,173
PROGRAMMING SYSTEM
Horst Funfstuck, Los Angeles, Calif., assignor to Statham Instruments, Inc., Los Angeles, Calif., a corporation of California
Filed June 22, 1966, Ser. No. 559,508
Int. Cl. H02p 5/00, 7/00; G05b 11/00
U.S. Cl. 318—18                                            4 Claims

ABSTRACT OF THE DISCLOSURE

A selectively variable electric power supply device provides controlled amounts of power to apparatus for modifying a desired condition. Variable speed motor drive is mechanically linked with the power supply device for adjusting the variable power device, as well as a variable voltage divider at the same time. A set of selectively variable voltage control devices are electrically connected in the motor drive circuit. A further set of selectively variable voltage control devices are interrelated with the electric power supply device and said first set of voltage control devices through nulling apparatus such that the motor drive is powered at a rate depending upon which voltage control device is connected in its drive circuit and drives in a direction to produce nulling. Stepping motor driven switch means progressively interrelates the various voltage control devices of both sets of the same.

---

Figure 1:
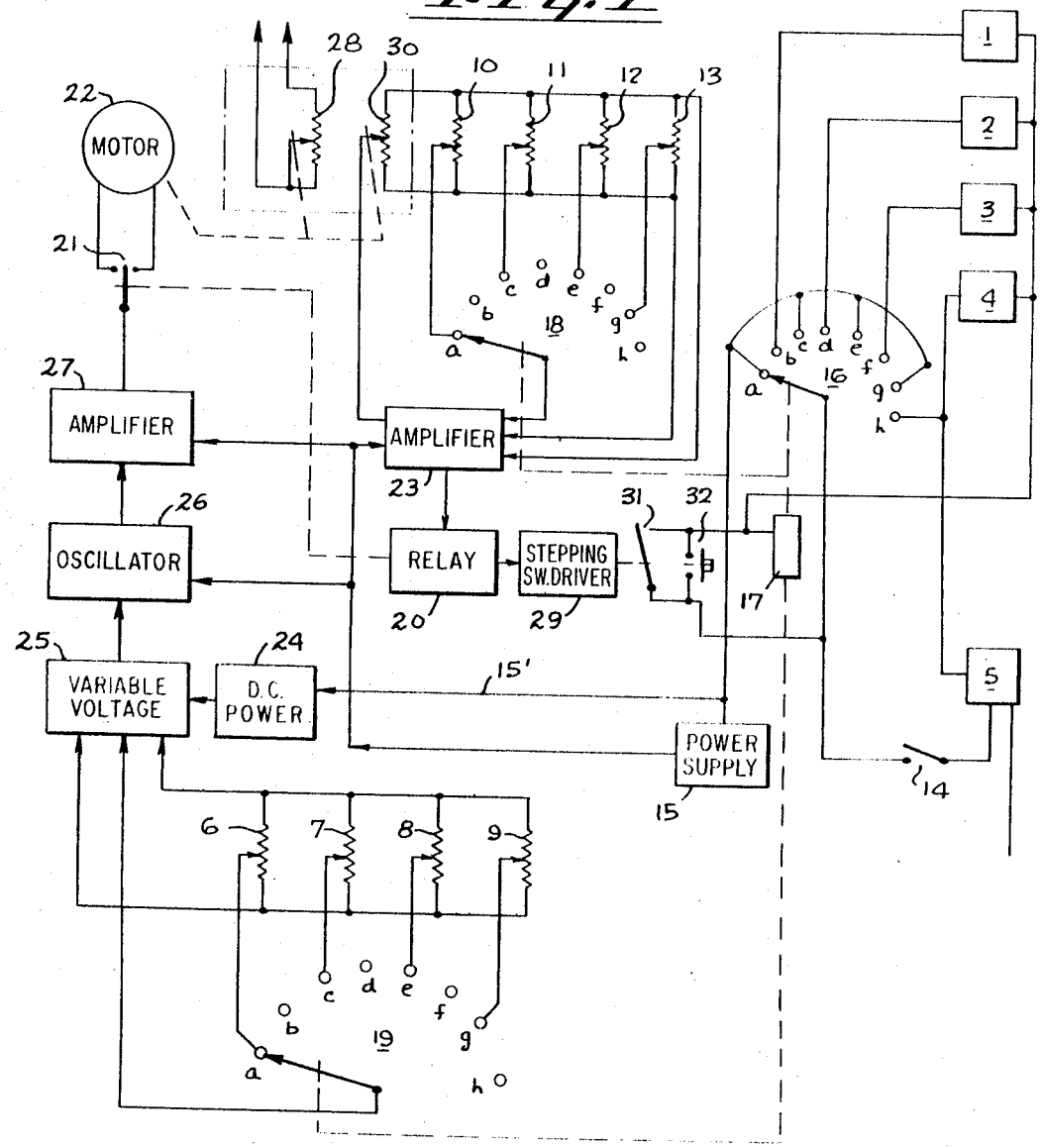
Figure 2:
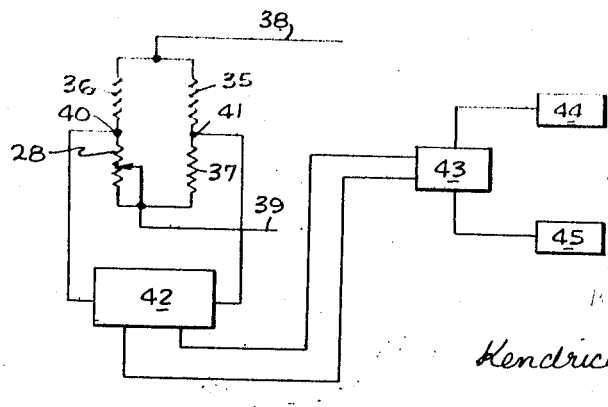

This invention relates to a rate and cycle sequence control system whereby a condition to be controlled is reported in the form of an electrical signal and may be varied at a determined rate and in cycles of determined periods.

In the embodiment which I presently prefer, that signal is responsive to a temperature in a space such as an environmental chamber in which it is desired to alter the temperature in a number of cycles at a predetermined constant or varied rate and for constant or varied time intervals from cycle to cycle.

The system of my invention is useful in combination with environmental chambers used in testing the effect of temperature and temperature variations on electrical components and electrical systems in the electrical arts. Additionally, it is useful when it is desired to determine the effect of temperature and temperature variations on compositions of matter, articles of manufacture, machines or biological systems.

In the prior art, these objectives have been met by controlling the rates and cycles mechanically by cam driven devices. These devices lack accuracy and ease of adjustability. In contrast with these prior art devices, the rate and cycle control system of my invention is programmed electrically. The rate and cycle characterics are controlled electrically by means of electronic components, as will be more fully described below.

The generic concept of my invention includes a system in which the total period of control is divided into a number of cycles and each cycle may be divided into phases. Each cycle includes a phase during which the condition to be controlled is varied at a predetermined rate, herein referred to as the "change phase," and a phase during which an attained value of the condition is varied at a different rate or maintained constant at a predetermined value for a period, herein termed a "dwell phase." Means are also provided to repeat the cycles at the same or different change phases, if desired, of dwell phases.

For this purpose, I provide means for selecting the total number of cycles desired, the rates of change of and the duration of the change phase, or the terminal value of the condition reached by the change, and the existence of and duration of the dwell phase.

In my preferred embodiment, the rate of change is controlled by adjusting the rate at which the unbalance between a reference voltage and a voltage, which is related to the magnitude of the condition to be controlled, is brought to a null. The system controls the rate of change of the condition responsive to the rate at which said voltage difference is brought to null. When the voltages are nulled, the terminal value of the condition at the end of the change phase is established. This change phase may be followed by a phase at a different rate of change by changing the rate at which a second voltage is brought to null.

In my preferred embodiment, a change phase is followed by a dwell phase of predetermined duration during which the condition remains at the terminal value achieved at the end of the change phase, and this completes the cycle.

In the system which I now contemplate to be the best for using my invention, the rate of change is determined by varying the resistance of a potentiometer, herein referred to as the condition adjusting potentiometer, at a predetermined rate. A reference voltage is established at a value such that, when the reference voltage and the condition adjusting potentiometer voltage are brought to balance, the condition to be controlled is brought to its terminal value. The rate at which the potentiometer resistance is adjusted is controlled by a motor whose rate of rotation is controlled by the frequency of the A.C. applied to the motor. The setting of the level of the voltage at the potentiometer at which null is obtained determines the terminal value of the condition at the end of the selected change phase. The duration of a dwell phase is controlled by a timer which is actuated when the terminal value of the voltage is reached.

The sequence of events described above may be repeated for as many cycles as desired, there being a rate controlling potentiometer for each change phase in each different cycle, to set the reference voltage, and a timer to control the duration of the dwell phase for each cycle.

To control the terminal value of the condition to be reached at the programmed end of the change phase, I employ a reference potentiometer, herein referred to as the dwell potentiometer, for each change phase in each different cycle, on which the wiper position corresponds, for each change phase, to the terminal value of the condition to be controlled.

To control the rate of change and the terminal value of the condition at the end of the change phase, I employ a stepping motor whose rate of angular displacement is controlled by the frequency of a square wave voltage applied to the motor. The rate of change is controlled for each cycle by adjusting the frequency of the square wave separately for each change phase in each different cycle. This controls the frequency of the pulses applied to the motor used and therefore its rate of rotation. The motor drives each of the condition adjusting potentiometers.

The frequency is preset by adjusting the position of the wiper on a potentiometer, herein referred to as the rate potentiometer. This controls the frequency of the output of a square wave generating system. There is one rate potentiometer for each change phase in each different cycle. Selecting switches electrically connect dwell and rate potentiometers to the circuit for the particular cycle being programmed. The other potentiometers for the other cycle are then disconnected from the circuit.

Means are provided for selecting the direction of angular displacement of the motor so that the voltage at the condition adjusting potentiometer is varied to increase or decrease the value of the condition in the predetermined manner. When the selected terminal value of the condition is reached, the voltage at the condition adjusting potentiometer reaches the voltage at the dwell potentiometer, whereupon the rate potentiometers and the dwell potentiometers and the stepping motor are cut out of the circuit. The system enters the dwell phase of the cycle, and a timer is connected to the circuit.

This condition remains during the dwell phase until the timer connects the rate potentiometer and dwell potentiometer of the next cycle into the system. This starts the motor at the selected rate of angular displacement chosen for the next change phase, and the cycle is repeated.

These and other objects of my invention will be further described by reference to a preferred embodiment which is described below in connection with the figures.

In FIGURE 1, timers 1–4 are in the form of clock controlled switches which will open after a predetermined interval of time and which may be selected. Such timers are well known. The counter 5 is an electromechanical device which will open the switch 14 after a predetermined number of impulses to the timer.

The present embodiment selected is a counter of which the total number of cycles desired in the program may be set. Thus, as will appear from the following example, I may employ a program of groups of four different sequential cycles which total 25 groups. Thus, I may set the digits on the timer at 25. The counter is energized to remove one digit after the completion of each group of four cycles and to open the circuit after the 25 digits are removed.

The dwell potentiometers 6, 7, 8 and 9 may be preset by adjusting the position of the wipers on each potentiometer. The rate potentiometers 10, 11, 12 and 13 may each be preset by adjusting the wiper position on each of the potentiometers.

14 is the main switch of the system.

15 is the main power supply connected to a 115 volt AC supply 15' and designed to deliver a DC voltage. The power supply 15 is connected to a stepping switch coil 17 which, through a mechanical connection, moves the rotary stepping switches 16, 18 and 19. Each stepping switch has eight stations marked a–h.

The polarized relays schematically shown at 20 and 21, are each connected to connect one of two windings on motor 22 to the power supply. The motor is driven either clockwise or counterclockwise, to move the wipers on the potentiometers 28 and 30, either to decrease or increase the voltage output across the potentiometers 28 and 30.

The potentiometer 30 is moved by the same mechanical connection as moves the potentiometer 28. The potentiometer 28 may be part of the condition controlling potentiometer in the control circuit for the condition. Thus, for example, it may be part of a temperature controlling bridge. The potentiometer 30 is the condition adjusting potentiometer.

The relays are driven by the directional amplifier 23, which actuates the relays to connect one or the other of the motor windings to the circuit. One or the other of the windings is connected to the circuit depending upon the relative levels of the voltage at the condition adjusting potentiometer 30 and at that one of the dwell potentiometers 10, 11, 12 or 13 which is in the circuit.

The relay 20 also activates stepping switch driver 29 and switch 31, to close the contact and activate the stepping switch coil 17. A manual switch 32 can also be used to activate the coil. These stepping switches are well known and need no further description.

The motor's angular rate of rotation is determined by means of a variable voltage source 25 fed by the DC supply 24 and connected to a variable voltage oscillator 26 and a flip flop 27. The frequency of the square wave delivered by the flip flop to the motor depends upon the voltage of the variable voltage source established by the rate potentiometers 6, 7, 8 and 9. The frequency is established to be of constant frequency, dependent on the setting of the wiper on the potentiometer 6 through 9 which is in the circuit.

Since the system uses conventional components, no specific description of each component will be required.

The number of cycles to be programmed is set on the counter 5 by rotating the counter to the desired number. At each impulse to the counter, it will rotate so as to subtract one cycle from the number of cycles set for the counter. This is a conventional type of counter. The duration of each of the different cycles is set by the timers 1 through 4 for each different cycle.

Four different cycles are illustrated. The counter 5 may be set for one or any number greater than one. Thus, for example, if it be set for 25, then the program will repeat the four cycles 25 times.

Assume the system is in the condition shown in FIG. 1. Having set the duration of the dwell phases on timers 1 through 4, the rate of the change phase of each cycle is preset by adjusting the wipers on the rate potentiometers 6, 7, 8 and 9. This may be done manually or by remote control.

The terminal value of the condition to be reached at the arrival of the dwell phase in each cycle is preset by adjusting the wipers on the dwell potentiometers 10, 11, 12 and 13 in the manner described for 6–9. The motor 22, through a mechanical connection, moves the wipers on the condition adjusting potentiometer 30 and the condition controlling potentiometer 28.

Since the wipers on potentiometers 28 and 30 are gang connected to the motor, they move in unison and equally or proportionally, depending on the mechanical connection.

The connection to the motor also moves the wiper on the potentiometer 28 so that the resistance rates at 28 are equal to or proportional to that at 30.

The system is activated by closing the switch 14. This connects the DC power supply 15, connected to an AC power line 15', to the counter 5 and the timers 1, 2, 3 and 4, through the stepping switch 16.

All of the timers 1 through 4 are in a position such that the circuit through them to the stepping switch contacts 16 are open. Thus, all stepping switches 16, 18 and 19 are at their initial position at station a. At station a stepping switch 16 connects the power supplies 15 and 24 to the system. Station a of stepping switch 18 connects the potentiometer 10 to the directional amplifier 23, and the station a of stepping switch 19 connects the potentiometer 6 to the variable voltage source 25.

All other stations of all stepping switches and the potentiometers and timers connected to them are out of the circuit. The relays 20 are set to a position to move the relay contact 21 into a position to drive the motor 22 in a clockwise or counterclockwise direction, depending on whether the potential at 30 is higher or lower than at 10, so that the motor moves the wipers on 28 and 30 to null the voltage difference between 10 and 30.

The variable voltage source 25, powered by the DC power supply 24, is connected to the voltage control oscillator 26 and flip flop and amplifier 27, to drive the motor at the rate set by the frequency of the pulses coming from 26.

For example, as stated above the potentiometer 28 regulates the rate at which the condition to be controlled is changed. Thus, if the temperature is the condition to be controlled in the space, it will control the rate of heat or cooling of the space to be conditioned by the system.

Since the control of temperature in a space by means of an adjustable potentiometer is conventional, no further description is necessary. However, I prefer to use, in combination with the system of this application, the system described in my copending application Ser. No. 528,488, filed Feb. 18, 1966, referred to below.

So long as a difference in voltage between potentiometers 10 and 30 exists, the voltage controlled oscillator 26 will be operated at a frequency determined by the setting of the potentiometer 6. The frequency of the generated oscillation is proportional to the DC voltage applied by 25, whose value is set by the potentiometer 6, energized by the power supply. This will cause the systems 25, 26 and 27 to generate a square wave pulse to be applied to the motor 22. One pulse applied to the motor will cause it to rotate a predetermined angle, for example, 15 degrees. Thus, the rate of rotation of the motor will depend upon the frequency of the pulses.

In the example chosen, 24 pulses per minute will cause the motor to rotate at the rate of one revolution per minute. The motor is coupled through a safety clutch and, for example, a 500 to 1 reduction gearing, to drive the wipers on 28 and 30. Thus, the wipers on the potentiometers 28 and 30 are moved at a rate determined by the position of the wiper on the potentiometer 6.

In the circuit, as illustrated, whenever there is a difference in voltage between the potentiometers 10 and 30, the output of the directional amplifier 23 is fed to one of the two relays shown in box 20. If, in the initial condition as shown in FIG. 1, on the closing of switch 14, the voltage at 10 is higher than at 30, the directional amplifier 23 will be poled to actuate one of the relays to connect the contact 21 to one or the other of the positions to drive the motor in the direction predetermined by the design. The reverse condition will drive the motor in the opposite direction.

By setting the initial position of the wiper on potentiometer 30, by which the magnitude of the relative potentials at 28 and 10 at the initiation of the first cycle is determined, the direction of rotation of the motor for the first cycle may be selected. When the motor has moved the wiper of potentiometer 30 to a position where the potential difference between the output of the potentiometers 10 and 28 is nulled, the output of the amplifier 23 will be substantially zero, and the relays 20 will be deenergized, opening the circuit to the motor windings, and the motor 22 will stop. The relays connect stepping switch driver 29 to the circuit to close the relay contact 31. This energizes the stepping switch coil to cause the stepping switch 16, 18 and 19 to move from station *a* to station *b*. The stepping switch driver opens the relay contact 31 by the time station *b* is reached.

In this position of the system, the timer 1 is placed into the circuit, all of the timers 2 through 4 being disconnected. Dwell potentiometers 10, 11, 12 and 13 and rate potentiometers 6, 7, 8 and 9 are out of the circuit, and the motor is inactive. The cycle enters the dwell phase. If, in space to be controlled, means are provided to maintain the temperature proportional to the resistance ratio attained by the potentiometer 28 at the end of the rate change phase, the temperature in the system may be maintained constant. Such a system is described in my copending application referred to above.

The dwell phase continues until the timer 1 connects the stepping switch 17 into the circuit, whereupon all the stepping switches are moved to station *c*. This ends the dwell phase of the first cycle. In this condition, the rate potentiometer 7 is connected to the variable voltage source 25, and the dwell potentiometer 11 is in the circuit. All other rate and dwell potentiometers are out of the circuit.

Depending upon the relative potential of 11 and 30, the directional drive amplifier 23 actuates the relays, to move the contact 21 into the position to move the potentiometer 30 to null the voltage difference between 11 and 30. The motor rotates at an r.p.m. determined by the position of the wiper on the potentiometer 7.

The change phase and the dwell phase of the second cycle are repeated in the manner described for the first cycle. The stepping switches move from station *c* to station *d* when the potential difference between the potentiometers 11 and 30 is nulled at the end of the change phase. This stops the motor 22 and connects timer 2 to initiate the dwell phase of the second cycle.

At the predetermined time, the timer 2 terminates the dwell phase of the second cycle in the manner described above for timer 1, and the stepping switch coil is energized to move the stepping switches to station *e*. This places the potentiometers 12 and 8 into the circuit.

Again the motor direction is selected, as described above, and the motor 22 rotates at the rate preselected by the position of the wiper on potentiometer 8. When the potential difference between 12 and 30 is nulled as the motor moves the wiper on 30, the motor stops, the stepping switches are actauted to move them to station *f*, and the dwell phase of the third cycle is initiated for the period determined by the timer 3, in the manner described above.

At the end of the dwell period, timer 3 causes the stepping switch coil 17 to become energized in the manner described in connection with the description of the previous cycles, and the stepping switches are moved to station *g*. This places the potentiometers 9 and 13 into the circuit, to initiate the change phase of the fourth cycle.

When the motor has moved the wiper of the potentiometer 30 to null the voltage between it and potentiometer 13, the motor 22 stops, and the stepping switches are moved to station *h*, connecting the timer 4 into the circuit and removing potentiometers 9 and 13 from the circuit. This initiates the dwell phase of the fourth cycle.

At the end of the dwell phase, the timer actuates the stepping switch coil, and the stepping switches are moved again to sation *a*, and counter 5 is actuated to remove one digit from the setting.

The above groups of four cycles are repeated, and one digit is removed from the counter 5 as many times as are required to bring the counter to zero, whereupon the counter 5 opens the switch 14 to deactivate the system.

While I have illustrated the programmer of my invention by the potentiometers, it will be understood that other equivalent adjustable devices, such as bridges or other voltage dividers, for example, may be employed to establish reference potentials as do the potentiometers 6–13. All these may be included within the generic term adjustable voltage divider.

While I have illustrated the means for adjusting the voltage at the potentiometers 28 and 30 by the stepping motor 22 and the frequency controlling system as described above, I may, as will be understood, employ any electrical or electromechanical means which will change the voltage at the output of the potentiometers 28 and 30 at a rate determined by the position of the potentiometers 6–9 or their equivalents.

An example of a condition to be controlled by the potentiometer 28 and adjusted by the potentiometer 30, useful in connection with the programmer of my invention, is described and claimed in my copending application Ser. No. 528,488, filed Feb. 18, 1966, which is hereby incorporated by this reference in its entirety. A temperature controlling bridge is provided. It includes the potentiometer 28, a temperature sensitive resistor 36, whose resistance changes with changes in temperature, and two temperature insensitive resistors 35 and 37. By temperature insensitve resistors, I mean those whose resistivity changes insubstantially or not at all with changes in temperature. The bridge is energized at 38 and 39. When the temperature in the space where 36 is positioned is other than that equivalent to the setting of the potentiometer 28, a voltage difference is developed across the bridge at 40 and 41, which is amplified in an error amplifier 42. When the voltage unbalance is caused by a temperature lower than that equivalent to the setting of the potentiometer 28, the output at 40 will be more positive than at 41, and the sensing servo circuit 43 will cause current to flow through the heater 44 in the space whose temperature is controlled. If the temperature is more than the equivalent to the setting of potentiometer 28, then the voltage at 41 is more positive than at 40, and the sensing servo system 43 will cause cooling fluid to circulate through the cooler 45 in the space whose temperature is to be controlled. This results in a temperature equavalent to the resistance drop of the potentiometer 28, and this temperature is maintained during the dwell phase.

While I have described a particular embodiment of my invention for the purpose of illustration, it should be understood that various modifications and adaptations thereof may be made within the spirit of the invention, as set forth in the appended claims.

I claim:
1. A programmer comprising a condition adjusting potentiometer, means for energizing said potentiometer to establish a potential at said potentiometer, means for adjusting said potentiometer at a controlled rate including motor means mechanically connected to said potentiometer, said motor having an angular rate of rotation responsive to the frequency of the current energizing said motor, and means for adjusting the frequency of said current, means to establish a reference potential, means for interrupting the adjustment of said potentiometer when the potential at said potentiometer and said reference voltage are brought to substantial balance, means to maintain said interruption for a predetermined time, and means to again adjust said potentiometer in a series of cycles.

2. In the programmer of claim 1, said means for adjusting the frequency including a square wave generator connected to said motor, a voltage controlled oscillator electrically connected to said square wave generator, and means to control the voltage applied to said oscillator to vary the frequency of square wave output of said square wave generator.

3. The programmer of claim 2, said means to control the voltage applied to said oscillator comprising a potentiometer connected to said oscillator and means to energize the potentiometer and means to adjust the voltage output of said potentiometer.

4. A programmer to control a condition which is varied at a predetermined rate during a change phase and maintained at a predetermined state during a dwell phase in repetitive cycles comprising a timer stepping switch containing a number of stations, each station connected to a timer, a dwell potentiometer stepping switch containing a number of stations, a plurality of dwell potentiometers each electrically connected to one of said stations, a rate controlling stepping switch containing a number of stations, a plurality of rate controlling potentiometers, each electrically connected to one of the stations of the rate controlling stepping switch, a square wave generator electrically connected to each said rate potentiometer, a stepping motor electrically connected to said generator, a separate condition adjusting potentiometer, said motor mechanically connected to said potentiometer to adjust the potential of said condition adjusting potentiometer, means to actuate said rate controlling stepping switch to disconnect the rate controlling potentiometers from the circuit and interrupt the rotation of the motor when the potential of said dwell potentiometer is substantially balanced by the potential of said condition adjusting potentiometer, means to move each of said stepping switches to another station, said timer stepping switch connecting one of said timers to the circuit, and said dwell potentiometer switch connecting another dwell potentiometer into the circuit, and said rate stepping switch connecting another rate potentiometer to said generator but maintaining said motor in the interrupted condition, means including said timer to move each of said stepping switches to still another position on expiration of a predetermined period of time in a sequence of operations whereby the potential at said rate adjusting potentiometer is caused to change at a predetermined rate to a predetermined terminal value and be maintained at said predetermined value for a predetermined period of time in a sequence of cycles, and means for connecting said programmer to a source of AC potential.

References Cited

UNITED STATES PATENTS

| 2,786,169 | 3/1957 | Muffly | 318—29 |
| 2,897,426 | 7/1959 | Hotine | 318—28 |
| 3,382,430 | 5/1968 | Cunniff et al. | 324—99 |

BENJAMIN DOBECK, Primary Examiner

U.S. Cl. X.R.

318—24, 28; 324—99